(12) United States Patent
Goldstein et al.

(10) Patent No.: US 6,490,031 B1
(45) Date of Patent: Dec. 3, 2002

(54) RADIOMETRIC SCATTER MONITOR

(75) Inventors: Michael Goldstein, Ridgefield; Keith Andresen, Wilton, both of CT (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/675,535

(22) Filed: Sep. 29, 2000

(51) Int. Cl.[7] .................................................. G01J 1/00
(52) U.S. Cl. ....................................... 356/121; 356/124
(58) Field of Search .............................. 356/121, 122, 356/123, 124, 213, 218, 216, 226, 43, 237.1; 355/53, 55, 67; 430/5, 324

(56) References Cited

U.S. PATENT DOCUMENTS

| | | | |
|---|---|---|---|
| 4,498,767 A | * 2/1985 | McGovern et al. | 356/121 |
| 4,620,790 A | * 11/1986 | Hufnagel | 356/124 |
| 4,799,791 A | * 1/1989 | Echizen et al. | 356/121 |
| 5,631,731 A | * 5/1997 | Sogard | 356/121 |
| 5,905,569 A | * 5/1999 | Suzuki | 356/121 |
| 5,949,534 A | * 9/1999 | Guttman et al. | 356/121 |

OTHER PUBLICATIONS

Basics of lithography, http://www.research.ibm.com/litho.
Chiu et al., "Optical lithography: Introduction," http://www.research,ibm.com/journal/rd/411/chiu.html.
CXrL Theses, http://www.xraylith.wisc.edu/pubs/thesis_1.shtml.
Lithography Products, http://www.svg.com/product/litho.html.
Micrascan III+, http://www.svg.com/product/litho/3plus.html.
Micrascan Family, http://www.svg.com/product/litho/family.html.
Micralign 700 Series, http://www.svg.com/product/litho/align700.html.
Products, http://www.svg.com/product/product.html.

* cited by examiner

Primary Examiner—Hoa Q. Pham
(74) Attorney, Agent, or Firm—Fish & Richardson P.C.

(57) ABSTRACT

Scattered light is detected radiometrically in a photolithography system. A photodetector makes direct measurements of scatter at points in the line or plane of illumination, and a generalized scatter function is derived from these measured data.

33 Claims, 5 Drawing Sheets

RADIOMETRIC SCATTER MONITOR

BACKGROUND

This invention relates to radiometric scatter measuring.

In a typical optical lithographic (also called photolithographic) process, as illustrated in FIG. 1, within an optical lithography tool 500 an image is copied from a reticle (mask) 100 onto a wafer 200 by projecting light 350 from a light source 300 through an illumination slot (frame) 150 over the patterned reticle 100, through precision optics (lenses) 400, onto the wafer 200. The wafer 200 has first been coated with a photoresist material (also called resist) that responds to light exposure in a specific, predictable way, e.g., by being made more or less soluble to a developer liquid upon illumination by light of a particular wavelength for a certain duration, under proper conditions.

In the ideal photolithographic process illustrated by FIG. 1, the imaged light 350 creates only an image on the wafer 200 that perfectly corresponds to the image or pattern of the reticle 100. In real-world photolithographic processes, however, as illustrated by FIG. 2, scattered light 370 (sometimes also known as flare or stray light) can, among other things, reduce the potential precision or efficiency of the system by reducing image contrast and process tolerances. The level of scatter can vary from system to system, within a single system, and over time.

The lithographic measurement of scattered light is commonly expressed as the percentage of open frame light intensity (i.e., the intensity of light near the surface of wafer 200 when reticle 100 is omitted or is transparent) measured in shadowed areas. One lithographic method of measuring scatter, described by Kirk, involves gradually increasing the light intensity (dose) over an opaque reticle feature until the image of the opaque feature formed in positive photoresist becomes fully developer-soluble. In other words, the opaque feature's image (which would not develop away in an ideal system) is subjected to scattered light to the point that it does develop away.

One opaque feature commonly used with this method is a 2 $\mu$m-wide isolated line in a clear field. This method requires observation of the dose in the clear surrounding area when the photoresist there develops away, followed by observation of the dose step when the image of the opaque line develops away. The scatter measurement is commonly expressed as a percentage, dividing the dose to clear the surrounding resist (Eo) by the dose to clear the line (Do). The larger the line's width, the further the light has to scatter to clear all the resist.

Measuring scatter as a function of feature size in this way has been a popular method for determining the scatter distribution—also called the point spread function (PSF)—of a photolithography system at relatively short ranges of spread (i.e., scatter at relatively short distances in the x-y plane from the light source). A second, similar lithographic scatter measurement method also described by Kirk is based on observing the receding edge of a photoresist image of an opaque reticle feature as the dose is increased and the edge recedes into the dark region of the image.

These lithographic scatter measurement methods already in use involve the measurement of Do along the length of the illumination slot, to track the changes in value. These methods can be tedious, time-consuming, and resource-intensive. Moreover, potential sources of error or imprecision in such measurement methods include the variation of Eo within a wafer and from wafer to wafer, the discrete dose increments used during testing, and human variability and error in the visual inspection steps of the process. In addition, photoresist-generated lens contamination can change the level and shape of the scatter PSF over time, and these effects can be overlooked by the standard lithographic measurement methods that use only one feature size, such as a 2 $\mu$m isolated line.

DETAILED DESCRIPTION

Figure 1:
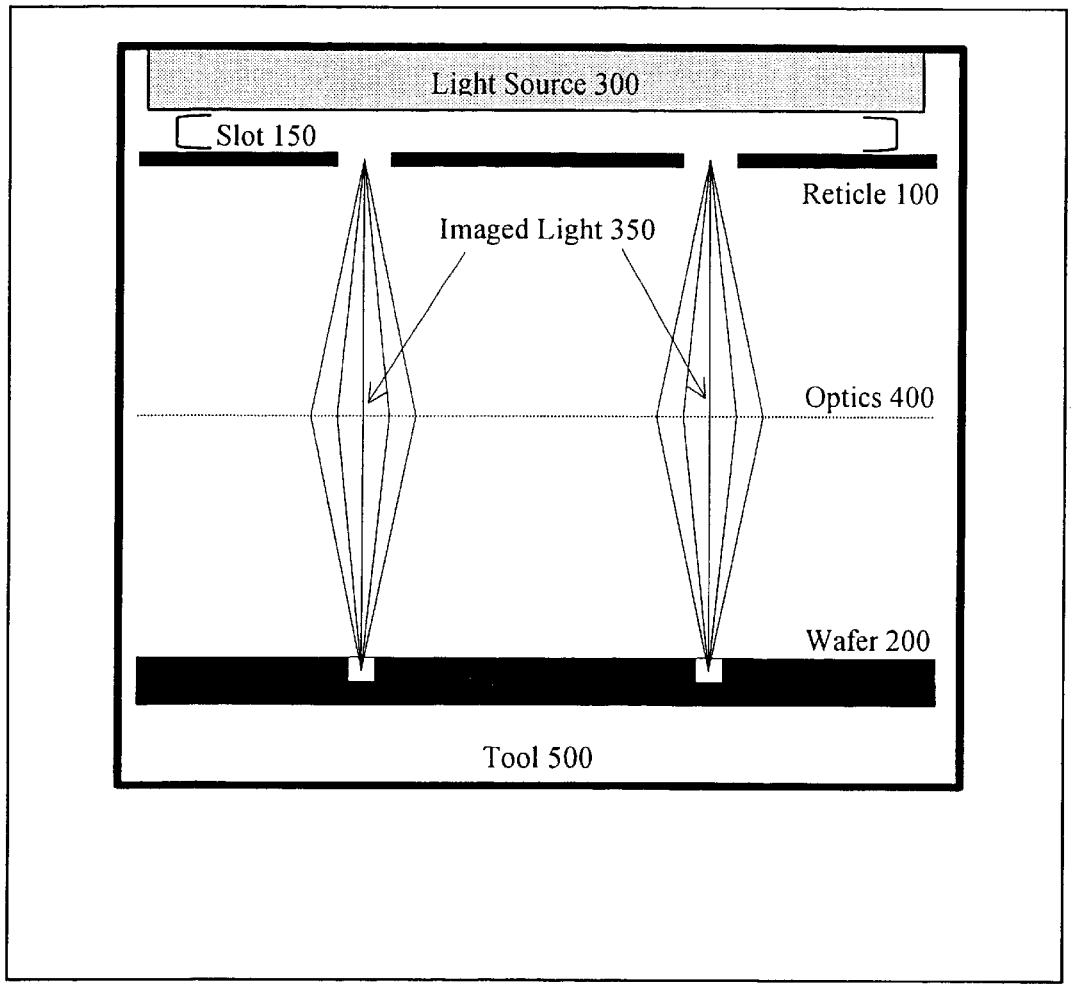
FIG. 1 is a representation of ideal geometric imaging in a photolithographic system.
Figure 2:
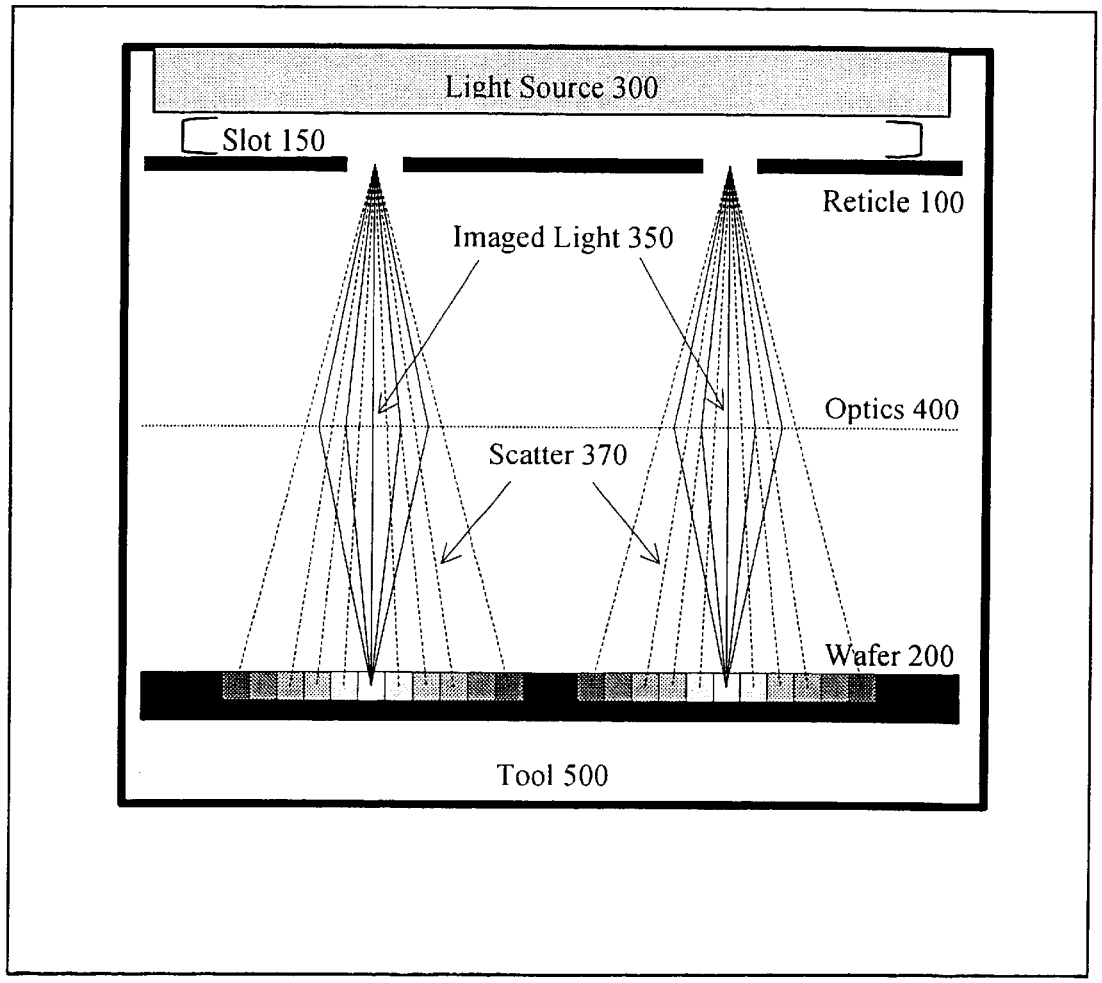
FIG. 2 is a representation of geometric imaging in a realistic photolithographic system that includes scatter.
Figure 3A:
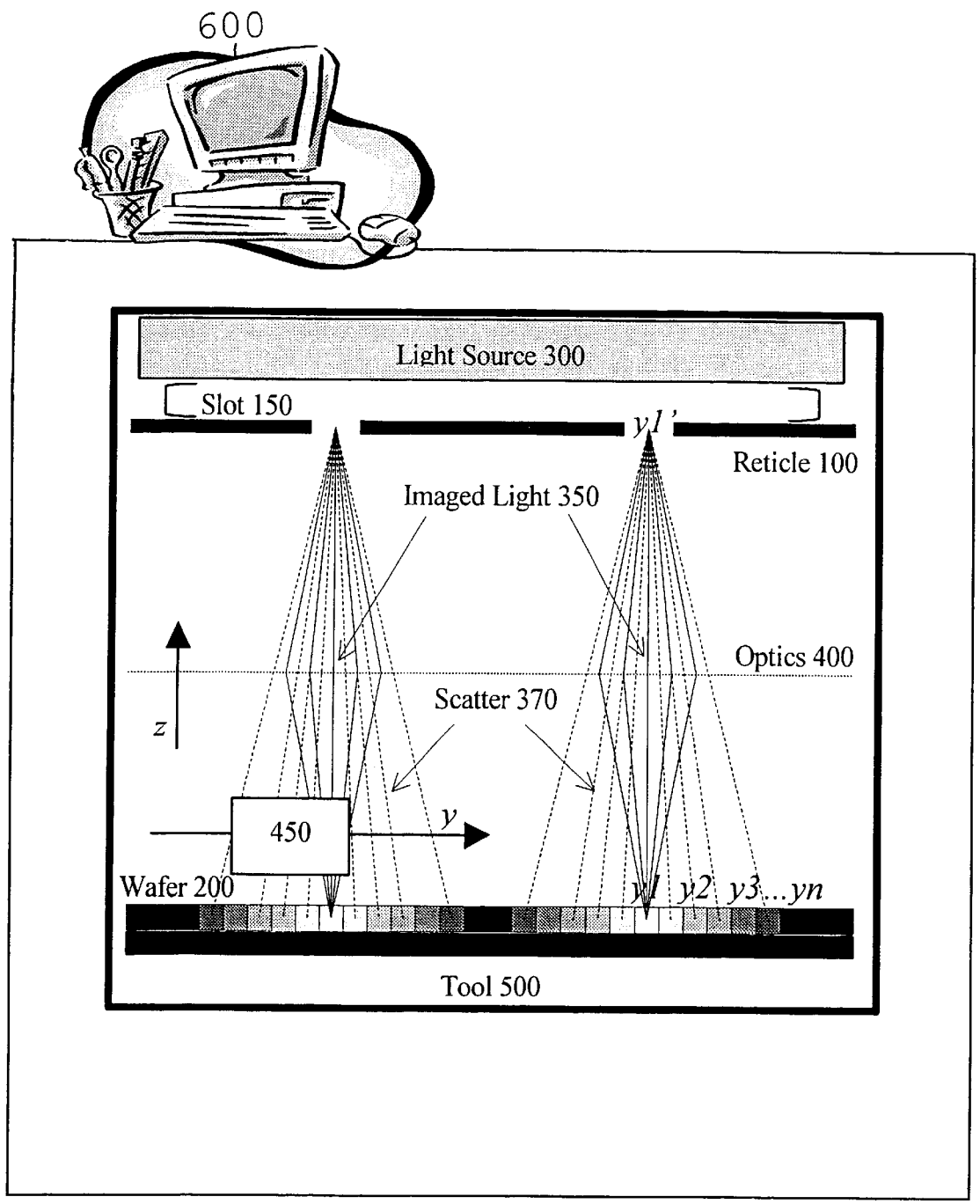
FIG. 3A depicts (in the y-z plane) the use of a detector to measure scatter in a photolithographic system, in accordance with an embodiment of the invention.
Figure 3B:
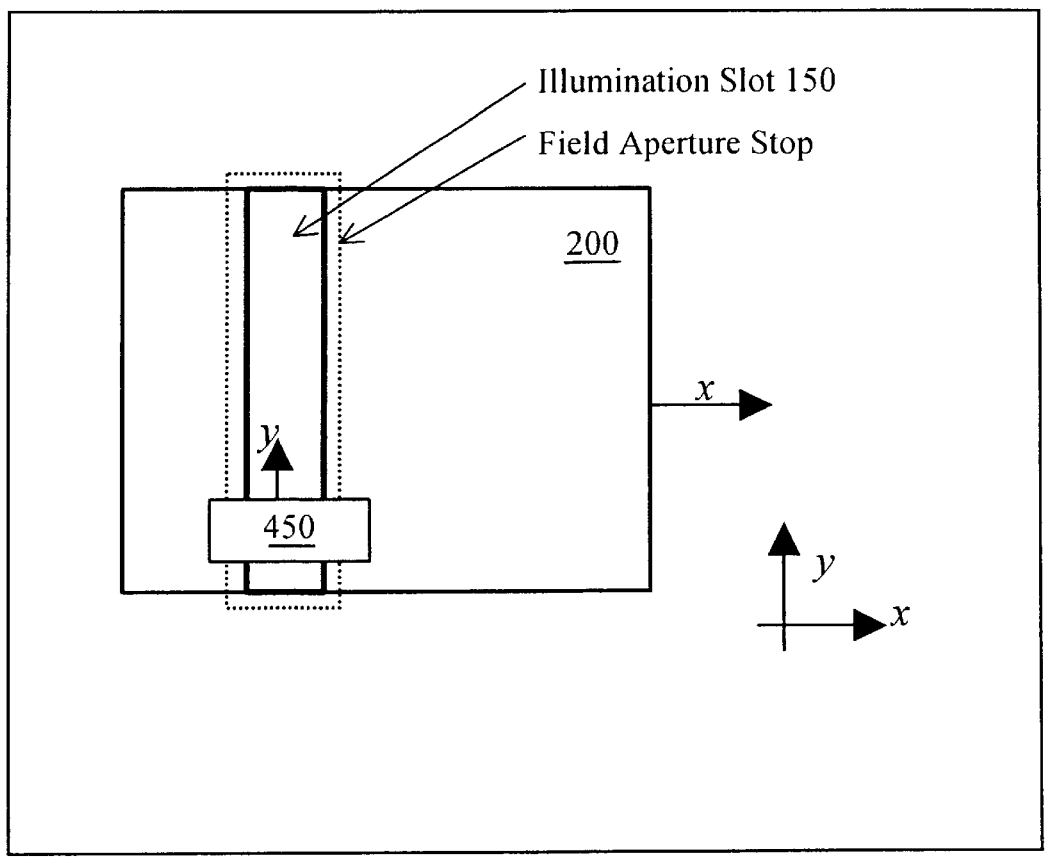
FIG. 3B shows (in the x-y plane) a field for radiometric scatter measurement in a photolithographic system, in accordance with an embodiment of the invention.

In one implementation of the invention, a new way to collect data on the scatter PSF of a photolithography tool over longer spread ranges, depicted in FIGS. 3A and 3B, is to make radiometric measurements using, e.g., a photodiode detector 450 that already is a standard component of many photolithography tools (e.g., "the uniformity head detector" in certain tools).

As depicted in FIGS. 3A and 3B, a one-dimensional (1-D) scatter PSF measurement can be accomplished by restricting illumination 350 with a suitable reticle 100 and scanning the detector 450 along the length of the illumination slot 150. Detector 450 typically is positioned relatively near the surface of wafer 200, and thus can be used to make suitable measurements of the light intensity at the surface of the wafer.

If the system were ideal, light originating at a point y1' on reticle 100 would be focused by optics 400 so as to converge only at the precisely corresponding point y1 on wafer 200. In a real system, however, some of the light from point y1' on reticle 100 will scatter to other points y2, y3, . . . yn on wafer 200. At any shadowed point y2, y3, . . . yn on wafer 200, the scatter from reticle point y1' may be radiometrically measured by detector 450, and the collective data may be used to derive a PSF for the system.

As the intensity of the illumination 350 at point y1' is increased, the light intensity at points y2, y3, . . . yn will increase and the degree of shadow at points y2, y3, . . . yn will decrease. The light intensity per millimeter of a shadowed region divided into the intensity at full exposure is the PSF at those measurement and source coordinates. The 1-D scatter PSF, $\chi(Y,Y')$, can be defined as the fraction of light per unit slot length originating from reticle point y1' that reaches wafer points y2, y3, . . . yn, from reticle point y2' that reaches wafer points y1, y3, . . . yn, etc.

Similarly, this method can be applied to make two-dimensional (2-D) scatter PSF measurements, where a 2-D scatter PSF $\chi(x,x',y,y')$ can be defined as the fraction of light per unit area originating from reticle coordinates (x',y') that reaches wafer coordinates (x,y). The plane of the scanning illumination slot 150 and a 2-D working field of the wafer 200 is depicted in FIG. 3B. For the 2-D radiometric scatter measurements, detector 450 could be scanned both along the length of the illumination slot 150 (the y axis) and horizontally across the working field of the wafer 200 (the x axis) under the illumination slot.

Besides deriving a PSF for the system in this way, the invention also can provide direct measurements of shadow for feature sizes that are larger than the effective size of the detector. In this aspect of the invention, the detector may be positioned directly beneath a larger feature of the reticle (where, in an ideal system, the measured shadow would be complete) and may be used to measure directly the intensity of light in that shadowed region. Furthermore, by combining the derived PSF data with such direct shadow measurements, it is possible to extrapolate or interpolate from these data to yield additional scatter characteristics, such as the 2 $\mu$m line scatter specification.

The invention can use a reticle 100 with at least one feature that produces a shadow with a known geometry. The reticle 100 is loaded into the tool 500, and the detector 450 is then positioned under the resulting shadow to measure the level of scattered light present. The detector 450 can be controlled to measure an average power level corrected for a dark signal measurement. By measuring dark features in a bright background and the complementary images, it is possible to completely characterize the scatter levels across the sampling plane.

Because scatter levels often vary with feature size and with distance, several different measurements usually should be made on a photolithography tool. As one example, radiometric measurements can be made with two or more line sizes. Larger feature sizes generally tend to reduce the level of scatter. As another example, a clear window in a chrome background on the reticle can be used, allowing the detector to directly measure the decaying signal as it is moved beyond and away from the geometric edge of the shadow.

Figure 4:
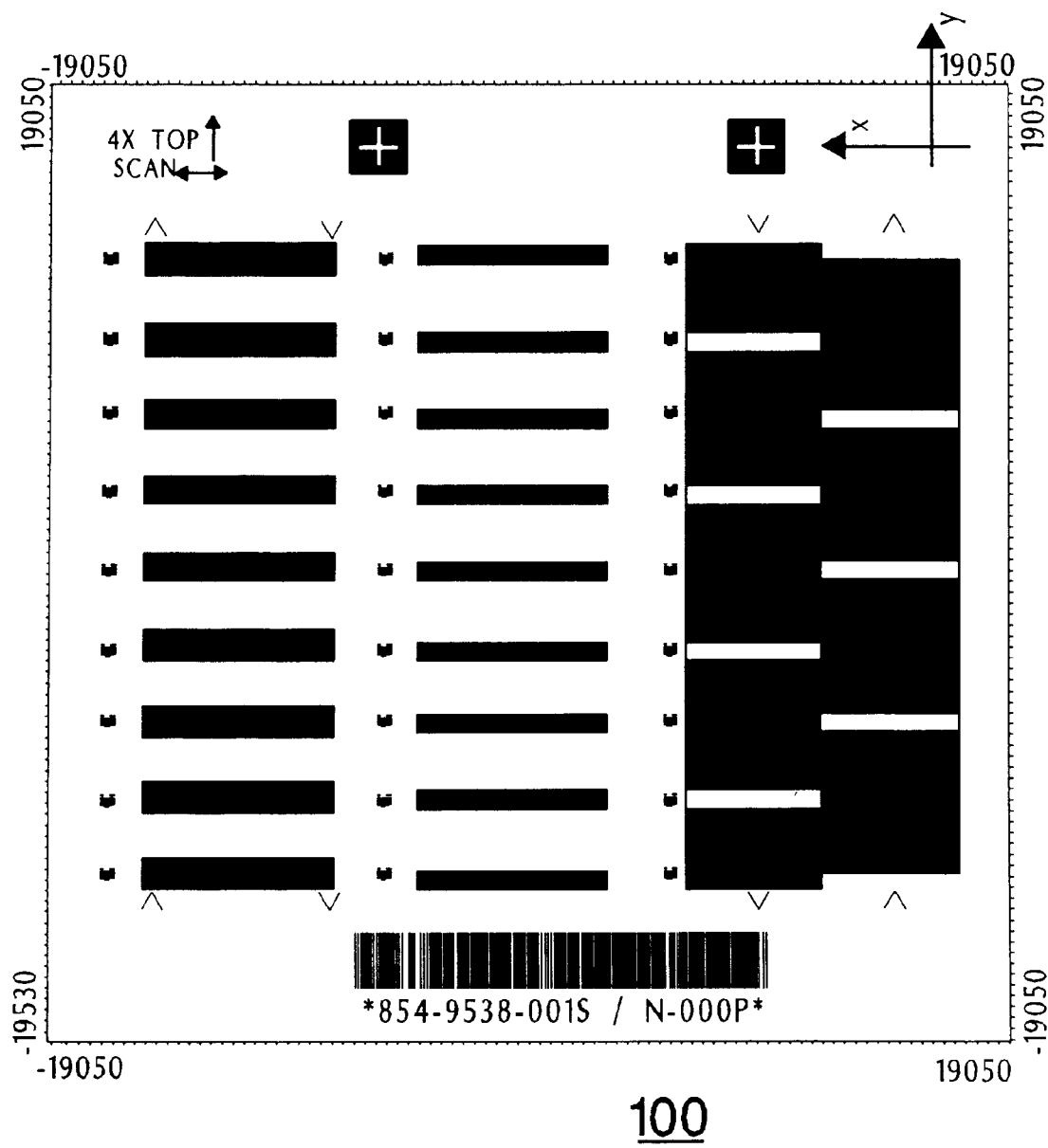
FIG. 4 is a sample scatter reticle 100 for use in radiometric scatter measurement in a photolithographic system, in accordance with an embodiment of the invention.

A specialized reticle 100 may be used with this radiometric scatter monitoring method, and this reticle may also incorporate standard features suitable for use in traditional lithographic measurement techniques. One example of a suitable reticle pattern is shown in FIG. 4. An embodiment of this method can use an arbitrary reticle pattern and illumination intensity function.

The invention can be automated by having a software-controlled computer govern the radiometric measurements made with the detector, perform calculations with the measured data relating to the PSF, etc. Such a computer could be either internal to the tool 500 or separate from the tool, such as the computer 600 shown in FIG. 3A. The computer may be programmed to scan the detector 450 along the illumination slot 150. The data collected by the detector 450 then provides the basis for calculating the scatter PSF. Calculation of the PSF may also be automated in such a way that scatter measurements may be read by a user directly from the lithography tool's display panel. Data from traditional lithographic measurement techniques can be incorporated into these calculations as well, or used for comparison or to validate the results of the radiometric measurement.

Radiometric scatter measurement thus can provide a consistent, repeatable basis for improved evaluation of photolithography tools and processes, and for improved precision in and control of such processes.

The lithographic and radiometric measurements methods can be complementary, because the former is able to measure short range effects (i.e., scatter at a relatively shorter distance from the light source, in the x-y plane) and the latter is able to measure long range effects (i.e., scatter at a relatively longer distance from the light source). The radiometric measurement method also offers some other advantages over the lithographic technique, including consistency, repeatability, precision, accuracy, and speed. Additionally, the radiometric measurement technique can be automated, thus alleviating the need for some of the time-consuming, subjective, and error-prone lithographic and metrology steps now commonly used (e.g., loading test wafers and requiring technicians to visually evaluate the results of each measurement procedure using microscopes). Radiometric scatter monitoring also can result in more accurate judgments regarding when lens cleaning is needed, thus improving process efficiency.

As photolithographic processes continue evolving, stringent process requirements may become increasingly dependent, in part, on correctly assessing and limiting scatter effects. This need in turn depends on the precise and accurate measurement of scatter and scatter variation. The scatter model described here, and the system and method for measuring scatter, were originally tailored to the development program for the Micrascan-X photolithography tool of SVG Lithography, Inc.; however, the model and the invention lend themselves well to other tools and other photolithography applications, including without restriction 248 nm, 193 nm, 157 nm, and extreme ultraviolet lithography.

Other implementations are within the scope of the following claims.

What is claimed is:

1. A method comprising:
    passing light through a reticle and optics to produce a shadow on a surface;
    radiometrically measuring scattered light in the shadow in the vicinity of the surface; and
    determining a scatter characteristic of the optics based on the measurements of scattered light.

2. The method of claim 1 in which the measuring is accomplished using a photodiode.

3. A method according to claim 2 wherein said photodiode comprises a uniformity head detector.

4. The method of claim 1 in which the measuring is repeated within a field in the vicinity of the surface.

5. The method of claim 1 in which the scatter characteristic of the optics includes a characterization of the amount of light scatter caused by the optics when a certain amount of light passes through the optics.

6. A method, comprising:
    passing light through a reticle and a lens of an optical lithography tool to focus non-scattered light at a location on a surface, the lens also causing scattered light to appear in the vicinity of the location where non-scattered light is focused;
    using a photosensor to measure non-scattered light at the location;
    using the photosensor to measure scattered light in the vicinity; and
    determining a scatter characteristic of the optical lithography tool based on the measurements of the scattered light and the non-scattered light.

7. The method of claim 6 in which the photosensor is scanned along an illumination slot of the photolithography tool.

8. The method of claim 6 in which determining the scatter characteristic includes calculating a fraction of light per unit length or per unit area.

9. The method of claim 6 in which the scatter characteristic of the photolithography tool includes a characterization of the amount of light scatter caused by the lens when a certain amount of light passes through the lens.

10. An apparatus comprising a machine-readable storage medium having executable instructions for radiometric measurement of scattered light in an optical lithography system, the instructions enabling the machine to:
use a photosensor to measure characteristics of scattered light underneath a reticle in the optical lithography system; and
determine a scatter characteristic of the optical lithography system based on the measurements of the scattered light.

11. An apparatus according to claim 10 wherein said photosensor comprises a uniformity head detector.

12. The apparatus of claim 10 in which the measuring is repeated within a field underneath the reticle.

13. An article comprising:
a storage medium having stored thereon instructions that when executed by a machine results in the following:
passing light through a reticle and optics of an optical lithography tool to focus non-scattered light at a location on a surface, the lens also causing scattered light to appear in the vicinity of the location where non-scattered light is focused;
using a photosensor to measure the non-scattered light at the location;
using the photosensor to measure the scattered light in the vicinity; and
determining a scatter characteristic of the photolithography tool based on the measurements of the scattered light and the non-scattered light.

14. The article of claim 13 in which the instructions when executed by the machine further results in scanning the photosensor along an illumination slot of the optical lithography tool.

15. The article of claim 13 in which determining the scatter characteristic includes calculating a fraction of light per unit length or per unit area passing through the reticle that reaches the one or more points in the field.

16. A method comprising:
passing light through a mask and optics to focus non-scattered light at a location on a surface, the optics also causing scattered light to appear in the vicinity of the non-scattered light;
measuring the scattered light and the non-scattered light in the vicinity the surface; and
comparing the measurement of the scattered light with the measurement of the non-scattered light.

17. The method of claim 16, further comprising determining a scatter characteristic of the optics based on the comparison of the measurement.

18. The method of claim 17 in which the mask comprises a transparent line in an opaque background.

19. The method of claim 17 in which measuring the scattered and non-scattered light comprises measuring the intensity of scattered light that passes through a region of the mask, and measuring the intensity of the non-scattered light that passes through the same region, the intensity of the scattered light measured at different locations in the vicinity of the surface.

20. The method of claim 17 in which the mask comprises an opaque line in a clear background, the opaque line causing a shadow to be formed on the surface.

21. The method of claim 20 in which measuring the scattered and non-scattered light comprises measuring the intensity of the non-scattered light outside the shadow, and the intensity of the scattered light in the shadow at different locations in the vicinity of the surface along a direction perpendicular to the opaque line.

22. The method of claim 21, further comprising dividing the scattered light intensity at each different location by the non-scattered light intensity.

23. The method of claim 17 in which the mask comprises opaque lines of different sizes in a clear background, the opaque lines causing shadows to be formed on the surface.

24. The method of claim 23 in which measuring the scattered and non-scattered light comprises for each shadow formed by one of the opaque lines, measuring the intensity of the non-scattered light outside the shadow, and the intensity of the scattered light in the shadow at different locations in the vicinity of the surface along a direction perpendicular to the opaque line.

25. The method of claim 24, further comprising comparing the measurements of the intensity the non-scattered light in different shadows.

26. The method of claim 16 in which the measuring is repeated over a field in the vicinity of the surface.

27. The method of claim 26 in which the field comprises an area of the surface that is exposed to light when the mask comprises a clear background with no opaque pattern in the background.

28. The method of claim 27, further comprising determining a point spread function by dividing the scattered light intensity at each different location by the non-scattered light intensity.

29. The method of claim 26 in which measuring the scattered and non-scattered light comprises measuring the intensity of the non-scattered light, and the intensities of the scattered light at different locations in the vicinity of the surface along a direction perpendicular to the transparent line.

30. The method of claim 29, further comprising for each of the different locations, dividing the scattered light intensity by the non-scattered light intensity.

31. A method comprising generating radiometric measurements of light that has been scattered from optics onto a surface as a result of light having been received at the optics from a reticle, and
deriving scatter characteristics about at least one of the reticle and the optics using the measurements.

32. The method of claim 31 in which the scatter characteristics includes a one-dimensional scatter point spread function.

33. The method of claim 31 in which the scatter characteristics includes a two-dimensional scatter point spread function.

* * * * *